US006867324B2

(12) United States Patent
Wölfert et al.

(10) Patent No.: US 6,867,324 B2
(45) Date of Patent: Mar. 15, 2005

(54) METHOD AND DEVICE FOR THE CONTINUOUS PRODUCTION OF ORGANIC MONO OR POLYISOCYANATES

(75) Inventors: Andreas Wölfert, Bad Rappenau (DE); Ulrich Penzel, Tettau (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/296,595

(22) PCT Filed: May 21, 2001

(86) PCT No.: PCT/EP01/05818

§ 371 (c)(1),
(2), (4) Date: Nov. 25, 2002

(87) PCT Pub. No.: WO01/91898

PCT Pub. Date: Dec. 6, 2001

(65) Prior Publication Data

US 2003/0166965 A1 Sep. 4, 2003

(30) Foreign Application Priority Data

May 26, 2000 (DE) .......................... 100 26 142

(51) Int. Cl.$^7$ ............................................. C07C 263/00
(52) U.S. Cl. .................. 560/347; 560/336; 560/338
(58) Field of Search ................. 560/330, 336, 560/338, 347

(56) References Cited

U.S. PATENT DOCUMENTS

| | | | |
|---|---|---|---|
| 3,507,626 A | 4/1970 | Van Horn | |
| 3,947,484 A | 3/1976 | Mitrowsky et al. | |
| 4,289,732 A * | 9/1981 | Bauer et al. | 422/224 |
| 4,851,571 A | 7/1989 | Sauer et al. | |
| 5,117,048 A | 5/1992 | Zaby et al. | |
| 5,763,697 A | 6/1998 | Hermann et al. | |
| 5,931,579 A | 8/1999 | Gallus et al. | |
| 6,576,788 B1 * | 6/2003 | Penzel et al. | 560/333 |

FOREIGN PATENT DOCUMENTS

| | | |
|---|---|---|
| DE | 2153286 B2 | 5/1973 |
| DE | 29 50 216 A1 | 6/1980 |
| EP | 0 271 684 A2 | 6/1988 |
| EP | 0 291 891 B1 | 11/1988 |
| EP | 0 322 647 B1 | 7/1989 |
| EP | 0 372 483 A1 | 6/1990 |
| EP | 0 830 894 A1 | 3/1998 |
| GB | 448489 | 6/1936 |
| WO | WO 97/21535 | 6/1997 |

OTHER PUBLICATIONS

Abstract of DE 1792660 B2.
Abstract of SU 519 129.
Abstract of DD 300168 A7.
Abstract of DE 3630097 A.

* cited by examiner

Primary Examiner—Johann Richter
Assistant Examiner—Karl J. Puttlitz
(74) Attorney, Agent, or Firm—Fernando A. Borrego; Howard & Howard Atty

(57) ABSTRACT

Starting material streams are mixed in a mixer (13) for the phosgenation of amines by a process in which the reaction product (3) is removed in a closed loop and the starting material streams (1.2) contain organic solvents. The main streams (1.1, 2.1) and/or part-streams (1.2, 2.2) of the starting materials (1, 2) come into contact with one another according to the countercurrent principle.

6 Claims, 3 Drawing Sheets

Figure 1:
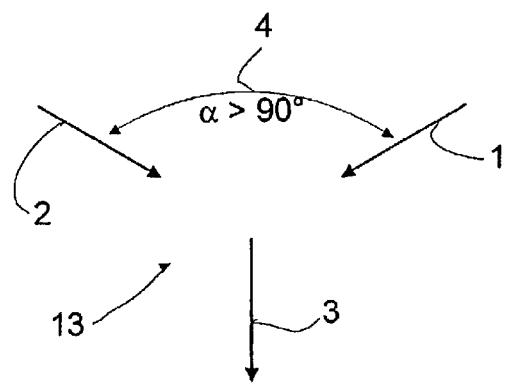

METHOD AND DEVICE FOR THE CONTINUOUS PRODUCTION OF ORGANIC MONO OR POLYISOCYANATES

The present invention relates to a process and an apparatus for the continuous preparation of organic mono- or polyisocyanates by reacting the mono- or polyamines corresponding to the mono- or polyisocyanates with phosgene at elevated temperatures, it being possible for the amines or the phosgene to be present in solution in an organic solvent.

DE 2 153 268 relates to a continuous prephosgenation process for the preparation of organic isocyanates. A diamine solution and phosgene solution in the turbulent state are mixed continuously in a driven centrifugal pump. The phosgene solution is introduced into the centrifugal pump through the suction connection of the multistage centrifugal pump and the amine solution is introduced into the lateral access additionally mounted in the middle between the first and the second impeller, before the prephosgenation mixture is transported by the multistage centrifugal pump into a downstream hot-phosgenation stage.

EP 0 291 891 B1 relates to a process for the preparation of isocyanates. Solutions and suspensions of primary amines and their salts are mixed with phosgene solutions and reacted, the two substances being introduced into a mixing zone which has at least one rotor disk. The resulting precursor is removed and the further reaction of the primary products formed is effected with heating. When carrying out the mixing, the phosgene solution is fed in axially relative to the rotor disk and the dissolved amine is sprayed parallel to the stream, but at a distance away from the stream of the phosgene solution, toward the rotor disk.

During the mixing processes with moving parts, which include the solutions described above, the bearing points of the moving parts are a source of potential danger owing to the high toxicity of the phosgene, since the phosgene can escape through said points in the event of leaks. Attempts were therefore made to find a procedure to achieve mixing of mono- or polyamines without moving parts.

EP 0 322 647 B1 discloses a process for the continuous preparation of mono- or polyisocyanates, in which, for the preparation of the starting mixtures, the amine component, which if required is dissolved in an inert solvent, and the phosgene solution are combined in a nozzle by constricting one of the two components in this nozzle and feeding the other component from the side, into this constriction, to the stream of the first component in a plurality of part-streams through a corresponding number of holes distributed over the circumference of the constriction. The total length of the constriction is chosen so that it comprises a part-length in which the reaction of the free amine is essentially complete. The disadvantage of this arrangement is that very small solid deposits in individual holes can lead to a lower flow rate through them.

DE-A1 29 50 216 discloses a process and an apparatus for thoroughly mixing two liquid components. The first component is introduced under pressure in the form of a fan-like jet into an essentially cylindrical mixing chamber, flowing along its longitudinal axis. Perpendicularly to this, the second component is introduced simultaneously under pressure in the form of at least two fan-like jets into the jet of the first component, in its flow region. The resulting mixture of the two liquid components is then transported from the mixing chamber into a downstream reaction zone. However, the process appears unsatisfactory owing to the high preliminary pressures required for the process.

SU 519 129 shows a production process for the preparation of isocyanates. A production process for isocyanates is presented in which gaseous phosgene is fed to a reactor at its bottom with a temperature between 100° C. and 180° C. The phosgene runs into an amine salt, which is fed to the reactor in its upper region. The amine salt is fed to the upper region of the reactor at a temperature between 40° C. and 100° C.

A Venturi mixing device is known from U.S. Pat. No. 3,507,626. This mixing device is designed for mixing a phosgene with an amine for the preparation of isocyanates. It comprises a first and a second inlet and an outlet. A first part of a pipe comprises a Venturi section with a converging part, a constriction and a diverging part. A second part is placed coaxially in the first part of the pipe and serves as a first inlet. The second part of the pipe comprises a bevel which corresponds to the converging part. The second part of the pope runs into a mixing chamber, which extends around the Venturi section of the first part of the pipe. The mixing device ensures the mixing and prevents the choking as a result of the production of by-products.

DE-AS 17 92 660 B2 relates to a process and a device for mixing and reacting an amine with phosgene resulting in an isocyanate. In this process the amine and the phosgene are conducted coaxially and mixed, the two streams of amine and phosgene being ring-shaped or conical. They intersect at a sharp-cornered crossing and mixing location and they are accellerated directly in front of, at, or behind the crossing location for entering into another reaction space in order to prevent a backflow of isocyanate into the stream of amine. This is made possible according to DE-AS 17 92 660 B2 by a device in which in the hollow part of the shaft of a T-shaped housing an inlet for the phosgene and in the hollow part of the transverse bar a passage for the amine are provided. A cylindrical member is located in the passage for the amine, which closes one end of this passage and determines a reaction zone in the other end of this passage. The cylindrical member contains in its end, which closes the passage, an inlet for the amine in the housing. The housing comprises a device for the adjustment of the velocity of flow of the amine. The end of this device, which points in the direction of a reaction zone, comprises a section with a reducing profile, which has a predetermined distance from the end region, which points in the direction of the reaction zone. This region directs the stream of amine entering into the cylindrical member in a certain angle away from the outer surface of the profile section and next to the reaction zone under a certain angle across the stream, which is directed to the passage. The stream of amine which flows through the passage, which is narrowed by the end region of the cylindrical member, meets the phosgene which flows in from the reaction zone under a certain angle.

EP 0 830 894 A1 relates to a mixer-reactor and a process for carrying out reactions, in particular the phosgenation of primary amines. In this mixer-reactor, it is intended to prevent the blockage of nozzles arranged rotationally symmetrically with respect to the mixing chamber by assigning a pin displaceable in the direction of the nozzle axis. However, moving parts in phosgene-reacting reactors are potential leakage points and should therefore be avoided as far as possible.

In view of the prior art solutions described, it is an object of the present invention to provide a process for the phosgenation of amines which requires the use of less solvent and a smaller phosgene excess and in which less byproducts form.

We have found that this object is achieved, according to the invention, if, in a process for mixing starting material streams in a mixer for the phosgenation of amines, in which the reaction product is removed in a closed loop and the starting material streams may contain organic solvents, main streams and/or part-streams of the starting material come into contact with one another according to the countercurrent principle.

In complete contrast to the opinion prevailing among those skilled in the art, the lowest degree of byproduct formation takes place when the starting material jets are fed directly toward one another. By means of the chosen flow of the educts amine and phosgene, which are used in a liquid phase, a maximum mixing intensity can be achieved since the momentum of the two jets of the liquid phase of the educts coming into contact with one.

The invention is explained in more detail below with reference to the drawing.

Figure 2:
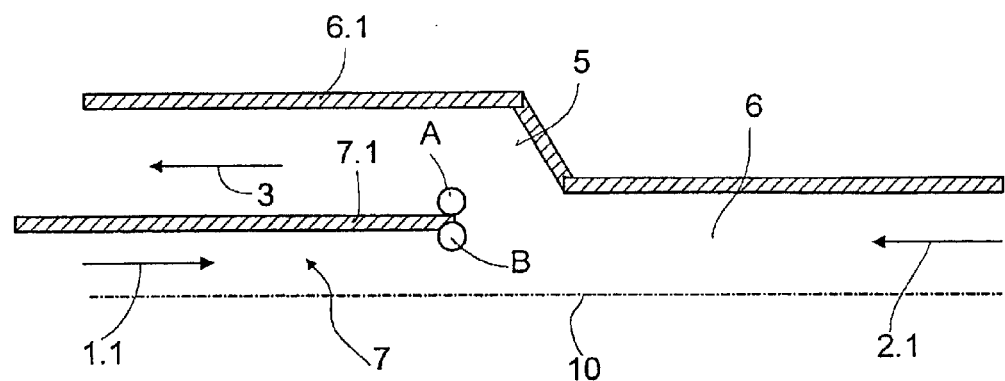
Figure 3:
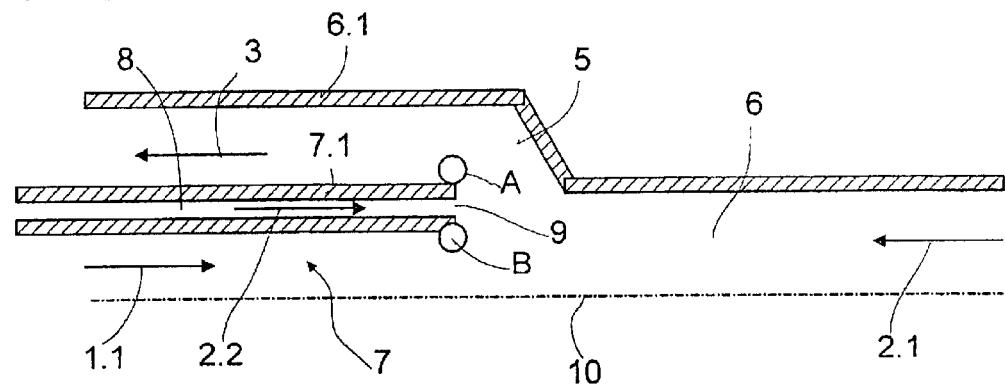
Figure 4:
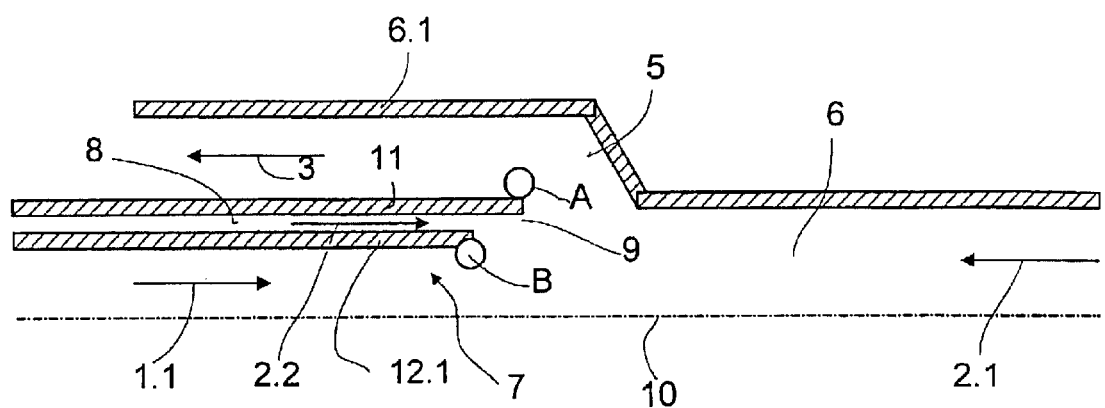
Figure 5:
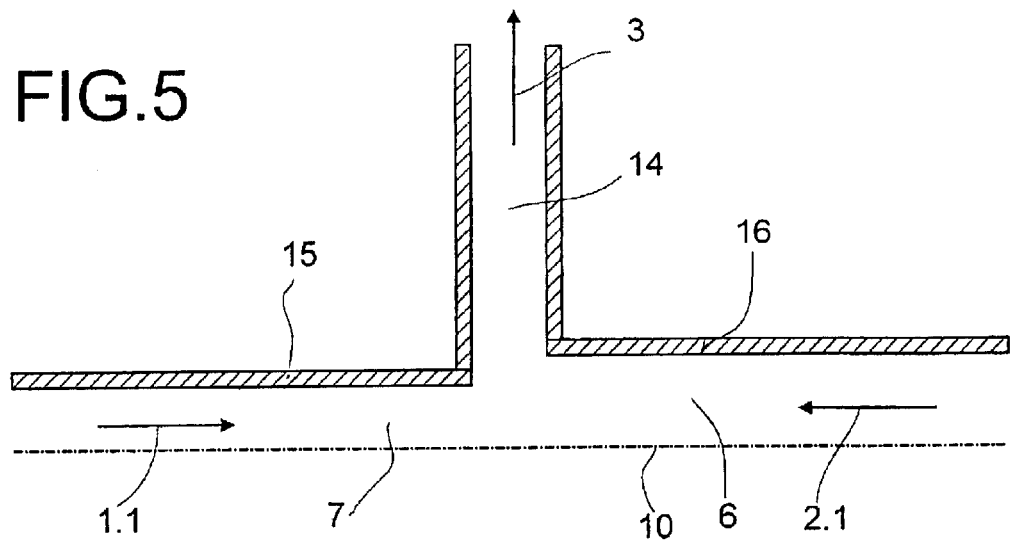
Figure 6:
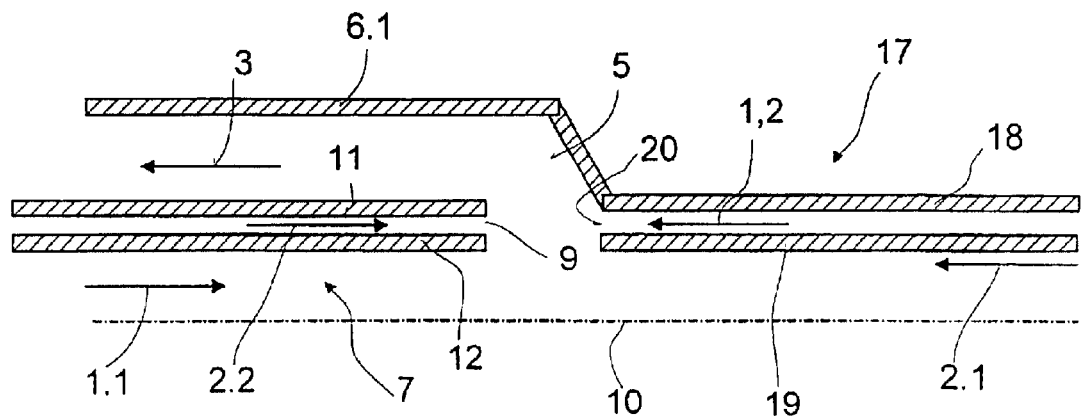
Figure 7:
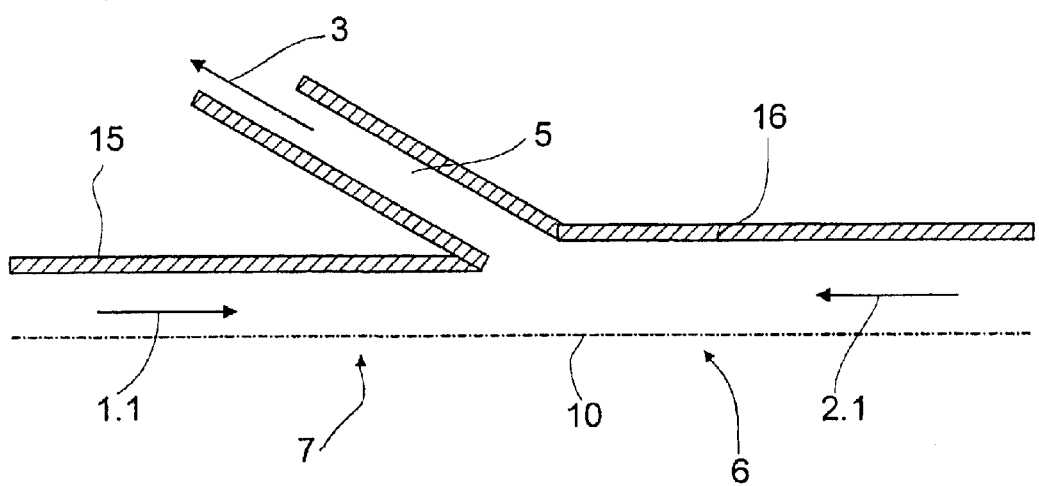

FIG. 1 shows the schematic configuration of a Y-mixer,

FIG. 2 shows the countercurrent mixing with axial discharge of the resulting reaction product, FIG. 3 shows the countercurrent mixing with division of a starting material stream into starting material main stream and starting material part-stream, FIG. 4 shows the countercurrent mixing with an annular gap surrounding a feed channel and having a shortened inner cylinder, FIG. 5 shows the countercurrent mixing with radial discharge of the resulting reaction product, FIG. 6 shows the surrounding of both starting material main streams with starting material part-streams of the respective other component and FIG. 7 shows the countercurrent mixing with generally inclined discharge of the reaction product.

The diagram according to FIG. 1 shows the schematic arrangement for a Y-mixer 13. A first starting material stream 1 and a second starting material stream 2 are fed in at a feed angle 4 which is greater than 90°. The resulting reaction product 3 is removed in a closed loop in a direction in space extending in the lower region of the mixer configuration 13 shown.

FIG. 2 shows the countercurrent mixing of two starting material streams with discharge of the reaction product essentially in the axial direction.

In the embodiment shown in FIG. 2, a main stream 2.1 of the second starting material flows in inside a feed channel 6 while the main stream 1.1 of the first starting material 1 flows in a feed channel directly countercurrently to the direction of flow of the main stream 2.1. In the embodiment shown, both feed channels 6 and 7 are, for example, symmetrical with respect to an axis 10 of symmetry. In the mixing zone of the two main streams 2.1 and 1.1 of the starting materials 1 and 2, respectively, a discharge line 5 branches off, which discharge line is separated by a bounding wall 6.1 on the one hand and by a partition 7.1 to the feed channel 7 of the first starting material main stream 1.1. The discharge line 5 extends essentially in the axial direction parallel to the shown feed channels 6 and 7 for the respective starting material main streams 1.1 and 2.1, respectively, and discharges the reaction product 3 formed from the mixing of the two starting material main streams 1.1 and 2.1. In the embodiment shown in FIG. 2, the feed angle 4 of the two starting material main streams 2.1 and 1.1 of the first and second starting materials, respectively, is about 180°, so that, as a result of the flow used here, the momentum of the two streams when they come into contact with one another can be utilized for achieving a maximum mixing intensity and for producing maximum mixing energy. On the partition 7.1 which separates the feed channel 7 of the first starting material main stream 1.1 from the discharge line 5 of the reaction product 3, the points critical for deposition of reaction components are marked by the letters A and B.

The diagram according to FIG. 3 shows the countercurrent mixing when one of the starting material streams is divided into a main stream and a part-stream.

According to these embodiments of a mixing means for mixing two starting material streams, the main stream 1.1 of the first starting material flows into a feed channel 7, which however is separated from the discharge line 5, through which the reaction product 3 leaves the mixing zone, not by a partition 7.1 according to FIG. 2 but by an annular gap 8. A part-stream 2.2 of the second starting material flows through the annular gap 8 so that a phosgene, in the present case a phosgene excess, can be established in the region of the annular gap orifice 9 of the annular gap 8. By establishing the phosgene excess in the region of the branch of the discharge line 5 from the feed channels 6 and 7, it is possible to avoid a build up of deposits at that point of the annular gap A which is marked with A, i.e. a bounding wall of the discharge line 5. It has been found that, by increasing the momentum of the main stream 1.1 of the first starting material stream in comparison with the momentum of the main stream 2.1 of the second starting material stream, the build-up of deposits at point B, i.e. on the inside of the feed channel 7, can be avoided. The avoidance of deposits at that point of the feed channel 7 which is marked with B can be effected by increasing the momentum of the main stream 1.1 of the first starting material regardless of whether this component is present in excess of in less than the stoichiometric amount.

Furthermore, in the embodiment shown in FIG. 3, the feed channels 6 and 7 for the main stream 1.1 of the first starting material and the main stream 2.1 of the second starting material are symmetrical with respect to an axis 10 of symmetry. In addition to a rotationally symmetrical design of the feed channels, it is of course also possible to realize other cross-sections in them.

FIG. 4 shows the countercurrent mixing with an annular gap surrounding a feed channel and having a shorter inner cylinder.

In the embodiment shown in FIG. 4, an annular gap 8 is present—in a manner roughly comparable with the embodiment according to FIG. 3—between the discharge line 5 of the reaction product 3 and the feed channel 7 for the main stream 1.1 of the first starting material. A part-stream 2.2 of the second starting material is fed through the annular gap 8 to the mixing zone of the two main streams 1.1 and 2.1 of the starting materials 1 and 2, respectively, so that a phosgene, in the present case a phosgene excess, is present in the mixing zone. By establishing the phosgene excess by feeding a phosgene part-stream 2.2 via annular gap 8, it is possible to avoid deposits, marked with A, in the region of the discharge line 5, while deposits can be effectively prevented at the point marked with B, in the region of the annular gap orifice 9, by the shortened design of that surface of the feed channel 7 which faces the axis 10 of symmetry. In the embodiment according to FIG. 4, the wall 6.1 bounding the discharge line is shown only schematically. In order to optimize the flow conditions, the transition of the feed channel 6 into the discharge line and the subsequent discharge line can be designed with well rounded edges offering very little resistance to flow.

It should also be stated that elements generating angular momentum can be installed in the feed channels 6 for the main stream 2.1 of the second starting material and in the feed channel 7 for the main stream 1.1 of the first starting material. During the mixing, the mixing energy liberated in the mixing zone during reduction of the angular momentum can be used for accelerating the mixing process. As an element generating angular momentum, it would be possible, for example, to introduce a twisted ribbon or spiral into the respective feed channels 6 and 7 for the main streams 2.1 and 1.1 of the two starting materials.

The diagram according to FIG. 4 shows the countercurrent mixing of two starting material streams with radial discharge of the reaction product.

In the embodiment shown in FIG. 5, the feed channels 6 and 7 for the main streams 2.1 and 1.1 of the two starting materials 1 and 2, respectively, are each rotationally symmetrical with respect to an axis 10 of symmetry. In the configuration shown in FIG. 5, the feed channel 6 for the main stream 2.1 of the second product has a greater diameter 16 compared with the feed channel 7 for the main stream 1.1 of the first starting material. The two feed channels 6 and 7 open into a radial discharge line which is common to both and is arranged exactly perpendicularly relative to the axis 10 of symmetry of the feed channels 6 and 7 and permits perpendicular discharge of the reaction product.

The diagram according to FIG. 6 shows countercurrent mixing of two starting material streams where both starting material main streams are surrounded by starting material part-streams of the respective other component.

Analogously to the embodiments described in connection with FIG. 3 and with FIG. 4, the discharge line 5 through which the reaction product 3 leaves the mixing zone is separated in the embodiment according to FIG. 6 by an annular gap 8. The annular gap 8 is bounded in each case by an outer pipe 11 and an inner pipe 12 which, in the embodiment shown, open into the annular gap orifice, both outer pipe and inner pipe being of equal length and feeding a part-stream 2.2 of the second starting material to the mixing zone. In the embodiment according to FIG. 6, moreover, the outer wall of the feed channel 6 is moreover in the form of a further annular gap 17. The annular gap consists of an outer pipe 18 and an inner pipe 19 and opens into the annular gap orifice 9 of the first annular gap 8 opposite, in the annular gap orifice 20, in the mixing zone of the two main streams 2.1 of the second starting material and 1.1 of the first starting material fed toward one another. The outer pipe 18 of the further annular gap 17 becomes the bounding wall 6.1 of the discharge line 5 for the reaction product 3, it being possible for the transitions to be designed with rounded edges favoring the flow conditions.

In the embodiment according to FIG. 7, countercurrent mixing with a discharge line, inclined at an angle, for the reaction product is shown.

In this embodiment according to FIG. 7, too, a main stream 2.1 of a second starting material is fed through a feed channel 6 to a mixing zone to which a main stream 1.1 of the first starting material is fed likewise through the feed channel 6, bounded by the outer wall 15. In the region of the mixing zone, a discharge line 5 for the reaction product 3 branches off and can be arranged at an angle $\alpha=30°$ with respect to the axis 10 of symmetry. In addition to the inclination of the discharge line 5, shown in FIG. 7, further intermediate forms between an axial discharge of the reaction products 3 according to the diagram in FIGS. 2 and 3 and the radial discharge 14 according to FIG. 5 are possible.

By means of the mixer configurations shown in the embodiments described above, mixing can be carried out with particularly effective utilization of the kinetic energy of the fluid streams. The method of mixing results in particularly thorough contact between starting materials, since the energy inherent in the starting material jets can be completely converted into mixing energy. The resulting high mixing intensities very substantially suppress byproduct formation and, by means of the novel process and the apparatus proposed according to the invention for mixing two streams, permit the advantages of high operational safety, avoidance of moving parts and achievement of high yields. Large phosgene excesses and high solvent contents in which the phosgene or the amines to be reacted have to be dissolved can be avoided, which is advantageous for subsequent working-up of the starting materials of the reaction product. As an example, it may be stated that 420 kg/h of 2,4-toluenediamine (TDA) were premixed as a solution in 2450 kg/h of o-dichlorobenzene (ODB) and sprayed together with 8100 kg/h of a 65% strength phosgene solution into a T-mixer. The entrance diameters of the T-mixer were chosen so that a mean entry rate of the phosgene and amine solution jets of about 10 m/s resulted. After clear phosgenation and working up by distillation, a yield of 96.4% was obtained.

In the case of identical flow rates and entry velocities and the use of a Y-mixer 13 with a feed angle 4 of about 120° between the two feeds, a yield of 95.3% was obtained after clear phosgenation and working up by distillation. Likewise in the case of identical flow rates and entry velocities and the use of a countercurrent mixer with radial discharge 14 of the reaction product 3, a yield of 97.4% was obtained after clear phosgenation and working up by distillation.

List of reference numerals

| | |
|---|---|
| 1 | First starting material stream |
| 1.1 | Main stream |
| 1.2 | Part-stream |
| 2 | Second starting material stream |
| 2.1 | Main stream |
| 2.2 | Part-stream |
| 3 | Reaction product |
| 4 | Feed angle |
| 5 | Discharge line |
| 6 | Feed channel for starting material 2 |
| 6.1 | Bounding wall |
| 7 | Feed channel for starting material 1 |
| 7.2 | Partition |
| 8 | Annular gap |
| 9 | Annular gap orifice |
| 10 | Axis of symmetry |
| 11 | Outer pipe |
| 12 | Inner pipe |
| 12.1 | Shortened inner pipe |
| 13 | Y-mixer configuration |
| 14 | Radial discharge |
| 15 | Outer wall of starting material channel 7 |
| 16 | Outer wall of starting material channel 5 |
| 17 | Further annular gap |
| 18 | Outer pipe |
| 19 | Inner pipe |
| 20 | Annular gap orifice |

We claim:

1. A process for the preparation of organic mono- or polyisocyanates comprising reacting amines with phosgene in which the mixing of separate starting material streams containing the amines and the phosgene both in a liquid phase runs according to the countercurrent principle, in which liquid main streams and/or part-streams of the amines meet with liquid main streams and/or part-streams of the phosgene under a feed angle of $\alpha>90°$ and in which the ratio of the momentum of the main stream of the amine to that of the main stream of the phosgene is >1 and the reaction product is removed in a closed loop.

2. A process as claimed in claim 1, wherein the starting material main stream are fed in surrounded by starting material part-streams.

3. A process as claimed in claim 2, wherein the main stream of one starting material is surrounded by a part-stream of another starting material.

4. A process as claimed in claim 1, wherein the reaction product is discharged through a radial discharge line.

5. A process as claimed in claim 1, wherein the reaction product is discharged through an axial discharge line.

6. A process as claimed in claim 1, wherein the reaction product is discharged by a discharge line, which is oriented in an angular range of from 0 to 90°, relative to an axis of symmetry.

* * * * *